United States Patent
Kozin et al.

(10) Patent No.: US 9,286,328 B2
(45) Date of Patent: Mar. 15, 2016

(54) PRODUCING AN IMAGE COPY OF A DATABASE OBJECT BASED ON INFORMATION WITHIN DATABASE BUFFER POOLS

(71) Applicant: International Business Machines Corporation, Armonk, NY (US)

(72) Inventors: Daniel Kozin, Santa Clara, CA (US); Arthur Marais, Montgomery, TX (US); Nigel G. Slinger, Los Gatos, CA (US); John B. Tobler, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 187 days.

(21) Appl. No.: 13/946,460

(22) Filed: Jul. 19, 2013

(65) Prior Publication Data
US 2015/0026133 A1   Jan. 22, 2015

(51) Int. Cl.
*G06F 17/30* (2006.01)
*G06F 11/14* (2006.01)

(52) U.S. Cl.
CPC .......... *G06F 17/30289* (2013.01); *G06F 11/14* (2013.01)

(58) Field of Classification Search
CPC .......... G06F 17/30088; G06F 11/1458; G06F 11/1471; G06F 12/0246; G06F 11/2025; G06F 9/45533; G06F 21/60; G06F 8/65; G06F 11/3688; G06F 21/10; G06F 21/31; G06F 9/4881; G06F 21/105; G06F 21/62; G06F 11/14; G06F 12/023; G06F 12/0866; G06F 12/0875; G06F 17/30289; G06F 17/3048; G06F 2212/311; G06F 11/3485; G06F 17/3002; G06F 17/30082; G06F 17/30156; G06F 2212/7201; Y10S 707/00053
USPC .......... 707/726, 781, 763, 639, 649, 705, 812, 707/805, E17.56, E17.005, E17.044; 711/6, 711/103, 104, 157, 161, 162, 163, 166, 711/200; 718/1, 104; 710/52; 370/476, 535, 370/540, 225, 276; 714/4
See application file for complete search history.

(56) References Cited

U.S. PATENT DOCUMENTS 4,525,780 A * 6/1985 Bratt .............. G01R 31/318505
                                                        711/163
5,269,013 A * 12/1993 Abramson et al. ............ 711/170
(Continued)

OTHER PUBLICATIONS

Wei Wang ; Tun Lu ; Tiejiang Liu ; Qi Wang—"Service deployment optimization oriented collaborative dynamic double buffer pool in clouds"—Published in: Computer Supported Cooperative Work in Design (CSCWD), 2011 15th International Conference on; Date of Conference: Jun. 8-10, 2011; pp. 408-415.*
(Continued)

*Primary Examiner* — Anh Ly
(74) *Attorney, Agent, or Firm* — Mohammed Kashef; SVL IPLaw Edell, Shapiro & Finnan, LLC

(57) ABSTRACT

According to one embodiment of the present invention, a system includes a processor to copy an object of a database system. The system determines one or more portions of the object that are active and reside within a buffer pool of the database system, and copies the determined portions of the object from the buffer pool. Remaining portions of the object that are non-active are copied from database storage. A copy of the object is created from the copied object portions. Embodiments of the present invention further include a method and program product for copying an object of a database system in substantially the same manner described above.

12 Claims, 4 Drawing Sheets

(56) References Cited

U.S. PATENT DOCUMENTS

| | | | | |
|---|---|---|---|---|
| 5,561,798 | A | * | 10/1996 | Haderle et al. ............... 707/682 |
| 5,572,645 | A | * | 11/1996 | Dan et al. ............... 348/E7.073 |
| 5,630,175 | A | * | 5/1997 | Gajewski ............... G06F 3/162 381/18 |
| 5,680,573 | A | | 10/1997 | Rubin et al. |
| 5,689,508 | A | * | 11/1997 | Lyles ............... 370/391 |
| 6,026,479 | A | * | 2/2000 | Fisher ............... G06F 9/30076 712/215 |
| 6,061,763 | A | * | 5/2000 | Rubin et al. ............... 711/129 |
| 6,523,102 | B1 | * | 2/2003 | Dye et al. ............... 711/170 |
| 7,039,784 | B1 | * | 5/2006 | Chen ............... G06F 3/061 348/E5.008 |
| 7,133,884 | B1 | * | 11/2006 | Murley et al. ............... 711/162 |
| 8,285,681 | B2 | | 10/2012 | Prahlad et al. |
| 8,307,174 | B1 | | 11/2012 | Misra et al. |
| 8,407,190 | B2 | | 3/2013 | Prahlad et al. |
| 2002/0103819 | A1 | * | 8/2002 | Duvillier et al. ............... 707/206 |
| 2002/0184579 | A1 | * | 12/2002 | Alvarez et al. ............... 714/719 |
| 2003/0061457 | A1 | * | 3/2003 | Geiger et al. ............... 711/165 |
| 2004/0123069 | A1 | * | 6/2004 | Franaszek et al. ............... 711/206 |
| 2004/0189623 | A1 | * | 9/2004 | Dunn et al. ............... 345/204 |
| 2005/0015756 | A1 | * | 1/2005 | Brown ............... G06F 9/45516 717/136 |
| 2005/0138087 | A1 | * | 6/2005 | Beck et al. ............... 707/204 |
| 2006/0085597 | A1 | * | 4/2006 | McNeill, Jr. ............... 711/118 |
| 2008/0162746 | A1 | * | 7/2008 | Ogura et al. ............... 710/35 |
| 2008/0281865 | A1 | * | 11/2008 | Price et al. ............... 707/103 Y |
| 2010/0036850 | A1 | * | 2/2010 | Garman ............... G06F 11/1448 707/636 |
| 2010/0036851 | A1 | * | 2/2010 | Paterson-Jones . G06F 17/30067 707/636 |
| 2010/0037031 | A1 | * | 2/2010 | DeSantis ............... G06F 11/1464 711/162 |
| 2011/0285729 | A1 | * | 11/2011 | Munshi et al. ............... 345/536 |
| 2012/0239871 | A1 | * | 9/2012 | Badam et al. ............... 711/104 |
| 2013/0073573 | A1 | * | 3/2013 | Huang et al. ............... 707/755 |
| 2013/0227207 | A1 | * | 8/2013 | Katz et al. ............... 711/103 |
| 2014/0101763 | A1 | * | 4/2014 | Harlacher et al. ............... 726/23 |

OTHER PUBLICATIONS

Wei Wang et al.—"Service deployment optimization oriented collaborative dynamic double buffer pool in clouds"—Published in: Computer Supported Cooperative Work in Design (CSCWD), 2011 15th International Conference on; Date of Conference: Jun. 8-10, 2011; Conference Location :Lausanne—pp. 408-415.*

Maruyama, N. ; and Matsuoka, S.—"Model-based fault localization in large-scale computing systems"—Published in: Parallel and Distributed Processing, 2008. IPDPS 2008. IEEE International Symposium on; Date of Conference: Apr. 14-18, 2008; Conference Location :Miami, FL—pp. 1-12.*

IBM; "Buffer Pool Analyzer User's Guide"; IBM Corporation; www.ibm.com/(DB2BufferPoolAnalyzerforz/OS/)/SC18-9986-01; 2008, 222 pages.

* cited by examiner

PRODUCING AN IMAGE COPY OF A DATABASE OBJECT BASED ON INFORMATION WITHIN DATABASE BUFFER POOLS

BACKGROUND

1. Technical Field

Present invention embodiments relate to copying database objects, and more specifically, to creating image copies of database objects based on information within database buffer pools.

2. Discussion of the Related Art

Enterprise database systems commonly rely on rapid backup of production level objects to ensure high availability. The backup or copy process can be disruptive since on-line database systems access the disk devices used for the backup or copy processes. In addition, some copy processing may be performed without allowing changes to the object being copied. In order to minimize disruption, the copy process should complete as rapidly as possible. This becomes more acute in a database-as-a-service deployment model since service level agreements (SLAs) for database users need to be satisfied. A disruption caused by copy processing could jeopardize online system performance and ultimately jeopardize the SLAs.

One common approach for creating full image copies of database objects copies the file (or dataset) representing the object from disk. However, this copy may reflect significantly stale data for on-line database systems. Data may be updated in a buffer pool, but not committed to disk for long durations. Although the copy may be rapid with only disruption to the disk device, the recovery process may be severely impacted by the stale copy since more database logs would need to be applied to the stale data. This may result in a failure to meet SLAs should recovery be required.

Another common approach reads the object sequentially into the database buffer pool and uses the data in the buffer pool to create the image copy. This creates a current image copy, but the copy process may be elongated due to inefficient use of the buffer pool. Pages from the object may already reside in the buffer pool when the image copy is started. By navigating sequentially through the object, active pages in the buffer pool may be processed to disk to free space in the buffer pool for earlier pages. When the active page that was removed from the buffer pool needs to be copied, the page is reloaded into the buffer pool before writing the page to the image copy. These extra input/output (I/O) steps may result in longer elapsed times for the image copy. In addition, if the number of active pages in the buffer pool is low relative to the object size, when the image copy process finishes, the buffer pool is filled with unused object pages. This temporarily disrupts database performance since the prior active working set gets reloaded back into the buffer pool.

BRIEF SUMMARY

According to one embodiment of the present invention, a system includes a processor to copy an object of a database system. The system determines one or more portions of the object that are active and reside within a buffer pool of the database system, and copies the determined portions of the object from the buffer pool. Remaining portions of the object that are non-active are copied from database storage. A copy of the object is created from the copied object portions. Embodiments of the present invention further include a method and computer program product for copying an object of a database system in substantially the same manner described above.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

Generally, like reference numerals in the various figures are utilized to designate like components.

DETAILED DESCRIPTION

A database management system controls access to various database objects. The database management system is responsible for ensuring that the database is available for processing queries and updates, and for maintaining object consistency throughout the queries and updates. Image or backup copies of database objects are typically produced for a recovery process that recovers data in the event of a database crash, preferably with as current data as possible.

Database objects are typically divided into portions (e.g., pages) for storage. These pages are loaded from database storage into a buffer pool to enable faster data access. Present invention embodiments produce a current image copy of a database object by using information within the buffer pool (or buffer pool awareness optimization). In particular, a buffer manager of a database management system maintains a list of active pages for each object in the buffer pool. The active pages within the buffer pool that originate from the object being copied are initially determined and copied. This avoids the need to reload those active pages should the pages be flushed from the buffer pool. The copied pages of the object need not be placed sequentially into the image copy. For example, if pages 5, 10, and 15 reside in the buffer pool, the copied object may have the initial three pages as pages 5, 10, and 15 (e.g., as opposed to pages 1, 2, 3 of the object).

After the active pages have been copied from the buffer pool to the image copy, the remaining non-active pages (e.g., remaining pages of the object that do not reside within the buffer pool) are copied from database storage. A portion of the buffer pool may be allocated as a temporary sub-buffer for the image copy process. The temporary sub-buffer is used to receive non-active pages of the object and transfer the received pages to the image copy. In addition, the production of the image copy may employ parallel threads for maximum throughput. A recovery process handles non-sequential ordering of the object pages within the resulting image copy.

Since the remaining portions of the buffer pool that have not been allocated for the sub-buffers remain available for active processing of other requests for access to the database (i.e., the non-active pages of the object are not read into the in-use portion of the database buffer pool), there is no disruption of on-line data processing. Further, due to the rapid nature of the copy process and the inclusion of active pages from the buffer pool, any staleness of a copied page is minimal, and a log application phase of a recovery process is maintained at low overhead.

Figure 1:
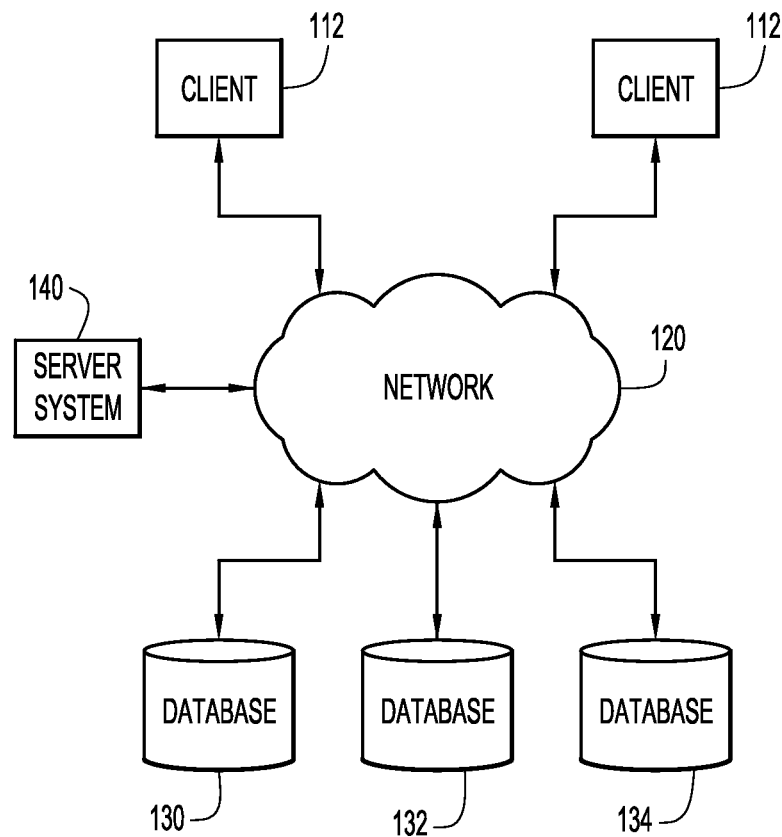
FIG. 1 is a diagrammatic illustration of an example computing environment for use with an embodiment of the present invention.

An example environment for use with present invention embodiments is illustrated in FIG. 1. Specifically, the environment includes one or more server systems 140, and one or more client or end-user systems 112. Server systems 140 and client systems 112 may be remote from each other and communicate over a network 120. The network may be implemented by any number of any suitable communications media (e.g., wide area network (WAN), local area network (LAN), Internet, Intranet, etc.). Alternatively, server systems 140 and client systems 112 may be local to each other, and communicate via any appropriate local communication medium (e.g., local area network (LAN), hardwire, wireless link, Intranet, etc.). Alternatively, server systems 140 may reside within the network with distributed processing to provide a cloud computing environment for producing image copies of database objects.

Client systems 112 enable users to submit requests (e.g., backup or copy requests, queries, etc.) to server systems 140 to perform various operations (e.g., searches, updates, backup or copies, etc.). The server system may be in the form of, or include, database management system 260, and includes image module 250 (FIG. 2) to produce an image copy of a database object as described below. The image module may be a stand alone module, or be embedded within the database management system. Databases 130, 132, and 134 may store various information and database objects, and interact with server systems 140. The databases may each be implemented by any conventional or other database or storage unit, may be local to or remote from server systems 140 and/or client systems 112, and may communicate via any appropriate communication medium (e.g., local area network (LAN), wide area network (WAN), Internet, hardwire, wireless link, Intranet, etc.). The client systems may present a graphical user interface (e.g., GUI, etc.) or other interface (e.g., command line prompts, menu screens, etc.) to solicit information from users pertaining to the desired operations, and may provide reports including operation results.

Alternatively, one or more client systems 112 may produce image copies from an associated database when operating as a stand-alone unit. In a stand-alone mode of operation, the client system stores or has access to the database, and includes image module 250 (FIG. 2) to produce image copies. The graphical user interface (e.g., GUI, etc.) or other interface (e.g., command line prompts, menu screens, etc.) solicits information from a user pertaining to the desired operations, and may provide reports including operation results. If client system 112 produces the image copy, then the database management system may provide an interface for image module 250 to know what pages are currently in buffer pool 220. The database management system may further provide an interface to image module 250 with access methods to load pages in and out of buffer pool 220.

Figure 2:
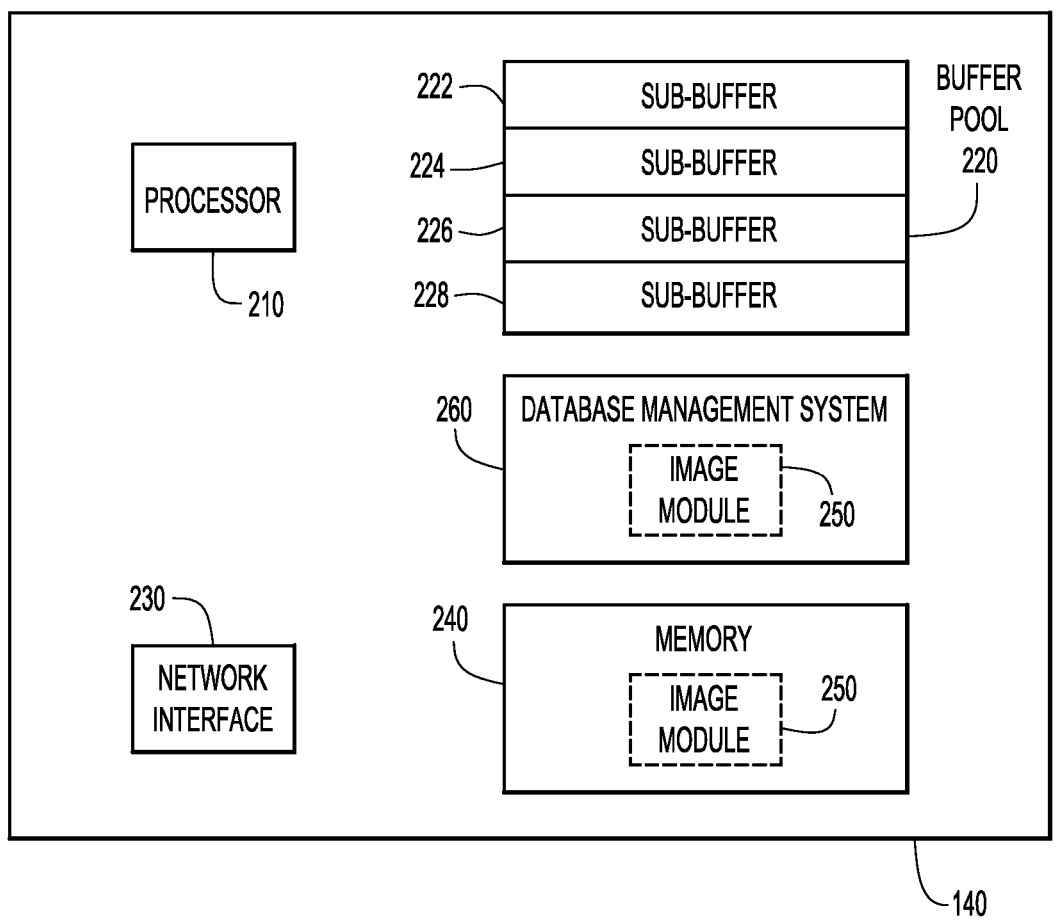
FIG. 2 is a block diagram of an example server system for creating an image copy of a database object according to an embodiment of the present invention.

Referring to FIG. 2, server systems 140 may be implemented by any conventional or other computer systems preferably equipped with a display or monitor, a base (e.g., including at least one processor 210, one or more memories 240 and/or internal or external network interfaces or communications devices 230 (e.g., modem, network cards, etc.)), optional input devices (e.g., a keyboard, mouse or other input device), and any commercially available and custom software (e.g., server/communications software, image module, database management system software, etc.). The server systems may further include a buffer pool 220 that generally comprises high-speed memory for storing data from databases 130, 132, 134. The buffer pool may be within or external of the database management system, and may be managed by the database management system, is utilized to provide rapid data access to data within the databases and to produce image copies of database objects. The buffer pool may be divided into one or more sub-buffers (e.g., sub-buffers 222, 224, 226, and 228 as shown in in FIG. 2) in order to enhance the throughput for producing image copies as described below. By way of example, sub-buffers 222 and 224 may be utilized for producing an image copy, while remaining sub-buffers 226 and 228 may be utilized for normal (e.g., client, etc.) access to database systems 130, 132, 134, thereby enabling the production of the image copy to minimally disrupt database access.

Memory 240 may include image module 250, and may further store the resulting image copy of a requested database object. Image module 250 may include one or more modules or units to perform the various functions of present invention embodiments described below. The various modules (e.g., image module, etc.) may be implemented by any combination of any quantity of software and/or hardware modules or units, and may reside within the memories of the server and/or client systems for execution by the processor.

Figure 3:
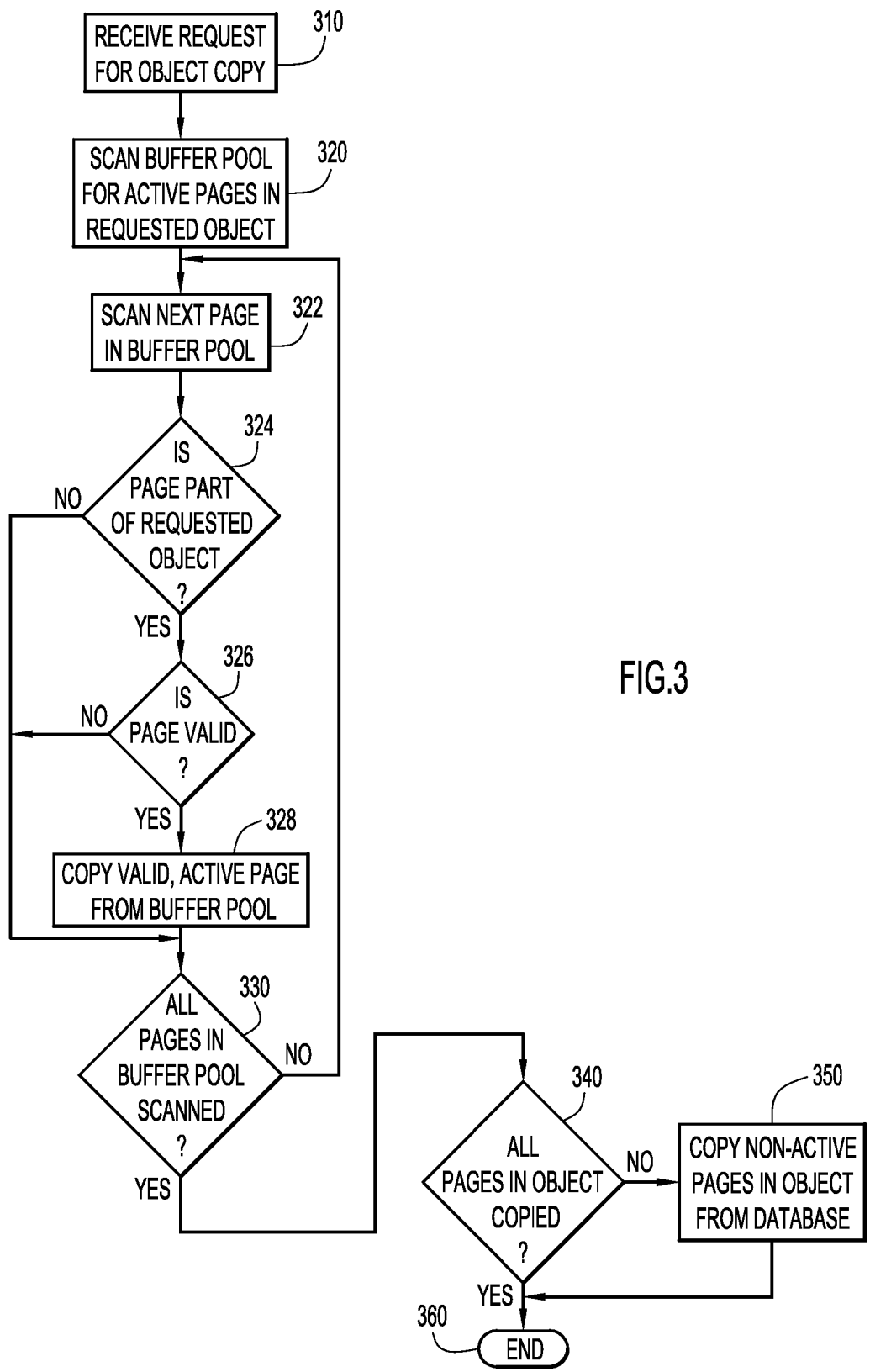
FIG. 3 is a procedural flow chart illustrating a manner of creating an image copy of a database object according to an embodiment of the present invention.

A manner in which an image copy of a database object is produced (e.g., via image module 250 and server system 140 and/or client system 112) according to an embodiment of the present invention is illustrated in FIG. 3. Initially, a request for an image copy or backup of a database object is received at step 310. The request may originate from a client system, or from within the server system (e.g., user request, request from an application, etc.). The request preferably includes one or more identifiers (e.g., database identification, object identification, etc.) to specify the object to be copied. Each database object (e.g., table, etc.) is partitioned into pages (e.g., blocks or units of storage of a predetermined size) for storage in the database and buffer pools as described above.

Buffer pool 220 is scanned for active pages that belong to the requested object at step 320. In particular, the first page of the buffer pool is scanned at step 322. If the scanned page does not belong to the requested object as determined at step 324, the next page in the buffer pool is scanned at step 322 in response to the presence of additional pages in the buffer pool as determined at step 330. In another embodiment, a buffer manager may keep a list of active pages in the buffer pool for each object, such that all of the pages in the buffer pool are not necessarily scanned.

When the scanned page does belong to the requested object, the scanned page is examined for validity. A page is considered valid when the data of the page includes the most recent data. For example, a page may be modified several times before any modifications are committed to database storage. When any given page is modified, remaining versions of that page are marked as invalid. If the scanned page is invalid as determined at step 326, the next page in the buffer pool is scanned at step 322 in response to the presence of additional pages in the buffer pool as determined at step 330.

When the scanned page is valid as determined at step 326, the active, valid page of the requested object is copied from the buffer pool to the image copy at step 328. The next page in the buffer pool is scanned at step 322 in response to the presence of additional pages in the buffer pool as determined at step 330. The above process is repeated until all of the pages in the buffer pool are scanned as determined at step 330.

Once the pages in the buffer pool belonging to the requested object have been copied, the presence of non-active pages of the requested object (e.g., pages of the object not residing in the buffer pool) is determined. If all of the pages of the requested object resided in the buffer pool as determined at step 340, the image copy is complete. However, if non-active pages of the requested object exist as determined at step 340, the non-active pages are copied from database storage to the image copy at step 350. For example, the non-active pages may be read sequentially from the database storage and stored within the buffer pool for transference to the image copy. Alternatively, a sub-buffer may be allocated within the buffer pool to be used to receive the non-active pages for transference to the image copy as described below.

Once all of the pages (e.g., active and non-active) of the requested object have been copied as determined at steps 340, 350, the resulting image copy represents a copy of the requested object and the process terminates at step 360. The resulting image copy may be stored in the memory of the server and/or client systems, or other locally or remotely accessible storage units (e.g., databases, processing devices, memories, etc.).

Figure 4:
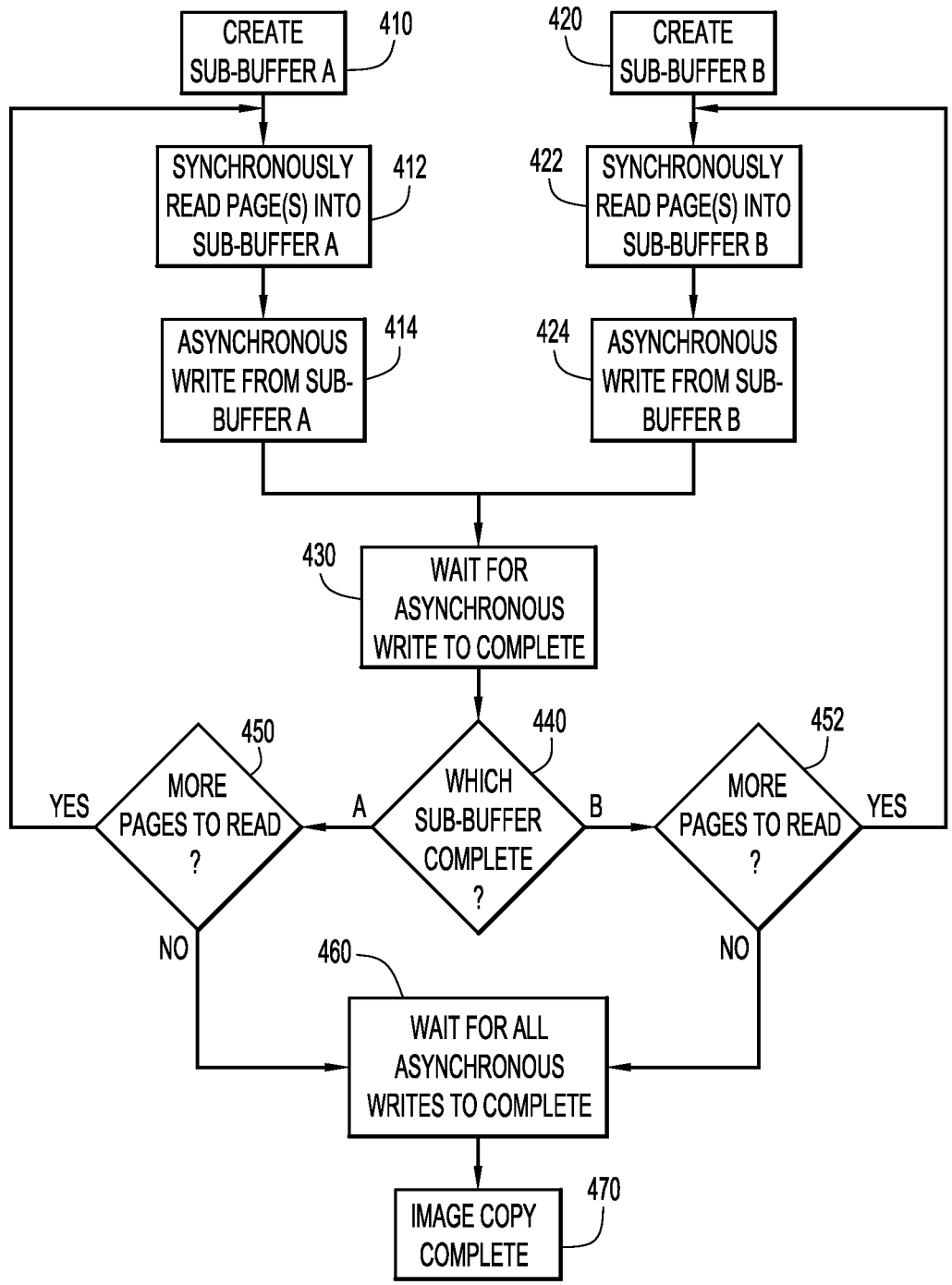
FIG. 4 is a procedural flow chart illustrating a manner of creating an image copy of a database object employing sub-buffers and parallel processing according to an embodiment of the present invention.

A manner in which an image copy of a database object is produced (e.g., via image module 250 and server system 140 and/or client system 112) utilizing sub-buffers and parallel processing to enhance throughput according to an embodiment of the present invention is illustrated in FIG. 4. By way of example, two sub-buffers (A and B) are allocated within the buffer pool to copy the non-active pages of the requested object from the database storage. Plural sub-buffers may be allocated to accommodate plural threads and/or plural I/O operations. Present invention embodiments may utilize any quantity of sub-buffers and threads for copying non-active pages of requested objects.

Initially, active pages within the buffer pool are scanned to identify and copy the pages belonging to the requested object in substantially the same manner described above (e.g., steps 310-340 of FIG. 3). In particular, portions of the buffer pool are allocated for sub-buffers A and B at respective steps 410 and 420. The sub-buffers are generally a subset of the buffer pool and dedicated for receiving non-active pages of requested objects for transference to the image copies. The sub-buffers may already exist if prior image copy processes have already allocated the sub-buffers. By way of example, the size of a sub-buffer may be based on the page size and the amount of information that can be accessed in a single input/output (I/O) operation from database storage, such that the sub-buffer can be read from and written to in parallel. One example, in which the speed of read I/O operations and write I/O operations are the same, may be expressed as:

$$\text{Sub-Buffer Size}=2*\text{MAX}(\text{page size}, ((\text{amount of data that can be accessed by a single } I/O \text{ operation } DIV \text{ page size})*\text{page size}));$$

where MAX is a function that returns a maximum value, page size is the size (or storage capacity) of a page, and DIV is a function that performs integer division (e.g., returns a truncated integer result). The page size is preferably defined to be less than or equal to the amount of data that can be accessed in a single input/output (I/O) operation. For example, if the database storage can access 130 kilobytes in one I/O operation, and each page is 4 kilobytes, the sub-buffer is sized to 256 kilobytes (e.g., 2*MAX(4 KB, ((130 KB DIV 4 KB)*4 KB)=2*MAX(4 KB, (32*4 KB)=2*128 KB=256 KB).

The non-active pages of a requested object are read and placed in sub-buffer A at step 412. Once pages are placed in sub-buffer A, the pages are transferred from sub-buffer A to the image copy at step 414. The non-active pages of the requested object are read and placed in sub-buffer B at step 422. Once pages are placed in sub-buffer B, the pages are transferred from sub-buffer B to the image copy at step 424.

The pages for sub-buffers A and B are synchronously read to avoid conflicting access to the same page and ensure that different pages of the requested object are stored in the sub-buffers. In other words, the synchronous reading of requested object pages prevents a page from appearing in more than one sub-buffer. By synchronously writing the requested object pages to sub-buffers A and B, the database management system ensures page consistency and knows when the entire block of pages is completely in the proper sub-buffer. If the pages are of sufficient size where plural input/output (I/O) operations are required to read/write a single page of the requested object, the pages are read into a sub-buffer asynchronously, and a synchronization is performed to ensure that the input/output (I/O) operations are complete and the entire page is present in the sub-buffer.

Pages are written or transferred from sub-buffers A and B to the image copy asynchronously since the pages are being retrieved from independent buffers, thereby avoiding conflicting access.

The process waits for one of the asynchronous write operations 414 or 424 to complete at step 430, thereby providing storage in the respective sub-buffer for another page from the requested object. In response to completion of the asynchronous write operation from sub-buffer A as determined at step 440, a subsequent page is retrieved from the requested object for placement in that sub-buffer at step 412 in response to the presence of additional pages as determined at step 450. Similarly, in response to completion of the asynchronous write operation from sub-buffer B as determined at step 440, a subsequent page is retrieved from the requested object for placement in that sub-buffer at step 422 in response to the presence of additional pages as determined at step 452.

Once the non-active pages of the requested object have been read into the sub-buffers as determined at steps 450, 452, the process waits for completion of all asynchronous writes from the sub-buffers at step 460. When the asynchronous writes have completed, a resulting image copy is produced at step 470.

A single thread may be employed with one or more sub-buffers to perform the above process. The input/output (I/O) operations may be queued in the case of plural sub-buffers to enable an available sub-buffer to receive and/or transfer information to the image copy. Further, plural threads may be employed to perform the above process with plural sub-buffers in parallel to enhance throughput. In this case, each thread transfers data with a corresponding sub-buffer concurrently. A serialized central control block communicates the pages that have been handled to coordinate processing of the object pages by the threads.

Since the non-active pages of a requested object are not read into the database buffer pools in use, present invention embodiments provide no disruption to on-line database processing for image copies. Although a non-active page of a requested object may become active during processing, the staleness of the copied page is minimal and the log application phase of the recovery process should be maintained at low overhead due to the rapid nature of the copy process. The techniques of present invention embodiments may be applied to image copy utilities that are integrated into a database management system in order to produce rapid, minimally disruptive image copies.

It will be appreciated that the embodiments described above and illustrated in the drawings represent only a few of the many ways of implementing embodiments for producing an image copy of a database object based on information within database buffer pools.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, image module etc.). These systems may include any types of monitors and input devices (e.g., keyboard, mouse, voice recognition, etc.) to enter and/or view information.

It is to be understood that the software (e,g., image module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., image module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., image copies, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

Alternative embodiments of the present invention may include copying the non-active pages before or concurrently with the active pages, such that the active pages are not removed from the buffer pool before being written to the image copy. Additional alternative embodiments include sub-buffers that are separate from the buffer pool (i.e., not a subset of the buffer pool), and/or sub-buffers that are permanently allocated to image copy processing. Further, alternative embodiments may include unequally sized sub-buffers. Still further, in some alternative embodiments, read operations may be performed asynchronously and/or write operations may be performed synchronously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of copying an object of a database system comprising:
   determining one or more portions of the object that are active and reside within a buffer pool of the database system and copying the determined portions of the object from the buffer pool;
   after copying the one or more portions of the object determined to be active from the buffer pool, copying remaining portions of the object that are non-active from database storage, wherein the buffer pool remains available for processing requests to the database system during the copying of the non-active portions; and producing a copy of the object from the copied object portions, wherein copying the remaining portions of the object includes: copying the remaining portions of the object into a plurality of sub-buffers in parallel and allocating one or more temporary sub-buffers to store the remaining object portions.

2. The computer-implemented method of claim 1, wherein the object portions include pages.

3. The computer-implemented method of claim 1, wherein the size of a temporary sub-buffer is based on a page size and an amount of data per an input/output operation.

4. The computer-implemented method of claim 1, wherein the copying the remaining portions of the object includes:

synchronously reading pages of the database object into one or more sub-buffers; and asynchronously writing from the one or more sub-buffers to the image copy.

5. A database system comprising:

a memory;

a buffer pool;

a processor configured to:

determine one or more portions of an object that are active and reside within the buffer pool and copy the determined portions of the object from the buffer pool;

after copying the one or more portions of the object determined to be active from the buffer pool, copy remaining portions of the object that are non-active from database storage, wherein the buffer pool remains available for processing requests to the database system during the copying of the non-active portions; and produce a copy of the object from the copied object portions, wherein the processor is configured to copy the remaining portions of the object by copying the remaining portions of the object into a plurality of sub-buffers in parallel and allocating one or more temporary sub-buffers to store the remaining object portions.

6. The system of claim 5, wherein the object portions include pages.

7. The system of claim 5, wherein the size of a temporary sub-buffer is based on a page size and an amount of data per an input/output operation.

8. The system of claim 5, wherein the processor is configured to copy the remaining portions of the object by synchronously reading into one or more sub-buffers and asynchronously writing from the one or more sub-buffers.

9. A computer program product for copying an object of a database system, comprising a non-transitory computer readable storage medium including a computer readable program, wherein the computer readable program when executed on a processor causes the processor to perform:

determining one or more portions of the object that are active and reside within a buffer pool of the database system and copying the determined portions of the object from the buffer pool;

after copying the one or more portions of the object determined to be active from the buffer pool, copying remaining portions of the object that are non-active from database storage, wherein the buffer pool remains available for processing requests to the database system during the copying of the non-active portions; and producing a copy of the object from the copied object portions, wherein the computer readable program causes the processor to copy the remaining portions of the object by copying the remaining portions of the object into a plurality of sub-buffers in parallel and allocating one or more temporary sub-buffers to store the remaining object portions.

10. The computer program product of claim 9, wherein the object portions include pages.

11. The computer program product of claim 9, wherein the size of a temporary sub-buffer is based on a page size and an amount of data per an input/output operation.

12. The computer program product of claim 9, the computer readable program further causing the processor to copy the remaining portions of the object by synchronously reading into one or more sub-buffers and asynchronously writing from the one or more sub-buffers.

* * * * *